(12) United States Patent
Farrell et al.

(10) Patent No.: US 10,230,527 B2
(45) Date of Patent: Mar. 12, 2019

(54) METHOD AND APPARATUS TO QUICKLY AUTHENTICATE PROGRAM USING A SECURITY ELEMENT

(71) Applicant: Continental Automotive Systems, Inc., Auburn Hills, MI (US)

(72) Inventors: Brian J. Farrell, Troy, MI (US); Jason Schwegler, Grand Blanc, MI (US); Sanjaya K. Dash, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 134 days.

(21) Appl. No.: 15/491,071

(22) Filed: Apr. 19, 2017

(65) Prior Publication Data

US 2018/0309578 A1 Oct. 25, 2018

(51) Int. Cl.
*G06F 11/30* (2006.01)
*H04L 9/32* (2006.01)
*G06F 21/44* (2013.01)
*G06F 12/14* (2006.01)

(52) U.S. Cl.
CPC ............ *H04L 9/3239* (2013.01); *G06F 21/44* (2013.01); *H04L 2209/84* (2013.01)

(58) Field of Classification Search
None
See application file for complete search history.

(56) References Cited

U.S. PATENT DOCUMENTS

| 8,949,611 | B1* | 2/2015 | Kimberly | .............. | H04L 9/3226 |
| | | | | | 713/176 |
| 2004/0162989 | A1* | 8/2004 | Kirovski | ................. | G06F 21/52 |
| | | | | | 713/189 |
| 2005/0183072 | A1 | 8/2005 | Horning et al. | | |
| 2009/0097661 | A1* | 4/2009 | Orsini | ..................... | H04L 9/083 |
| | | | | | 380/279 |
| 2015/0067855 | A1 | 3/2015 | Lee et al. | | |
| 2015/0356319 | A1* | 12/2015 | Kimberly | ................ | G06F 21/64 |
| | | | | | 726/1 |

OTHER PUBLICATIONS

International Search Report and Written Opinion dated Jul. 16, 2018 from corresponding International Patent Application No. PCT/US2018/027527.

* cited by examiner

*Primary Examiner* — Gary S Gracia

(57) ABSTRACT

The authenticity of a program executed by a processor is determined by a security element that computes a hash code over re-ordered segments of a known-to-be-authentic copy of a program executed by the processor. The authenticity of the same segments are re-ordered by and provided by the processor to the security element, which computes a second hash code for the re-ordered segments received from the processor. If the hash values for the segments are identical, the program segments are identical. If the hash values for any segment are different, the two programs are different. When a processor's program is determined to be different from a known good copy, the processor can be stopped or an alarm signal generated.

16 Claims, 5 Drawing Sheets

METHOD AND APPARATUS TO QUICKLY AUTHENTICATE PROGRAM USING A SECURITY ELEMENT

BACKGROUND

Many systems and features in a motor vehicle are controlled by processors, i.e., microprocessors, microcontrollers and digital signal processors, each of which executes program instructions stored in non-transitory memory devices that are coupled to the processors by a bus. (As used herein, the term "bus" refers to a set of electrically-parallel conductors that form a main transmission path between a processor and devices peripheral to the processor, including non-transitory memory devices.) Such memory devices can be located away from a processor while other non-transitory memory devices storing program instructions are resident on the same silicon die as the processor that executes the instructions.

When program instructions are changed, the processor executing the program will change the function or system that it controls accordingly. It is thus possible to change the operating characteristics of a vehicle simply by changing the program instructions executed by a processor that controls a vehicle function or system. It thus becomes important for vehicle manufacturers to maintain the integrity or authenticity of a program that controls a vehicle function. Stated another way, it is important for a vehicle manufacturer to prevent the execution or use of unauthorized modifications of the software that controls the processors within a vehicle.

Some processors that provide critical functions within a vehicle need to perform a program authenticity check in order to ensure that the processor's program has not been modified improperly, i.e., is not unauthorized (by the manufacturer). In order to quickly check a program's authenticity, some processors use a dedicated security element, which can be either external to the processor, i.e., on a different silicon die, or "internal" to the processor, i.e., on the same silicon die, an example of which would be an integrated circuit having multiple processors on the same silicon die. Regardless of where the security element might be located, it is configured (programmed) by the vehicle's manufacturer to confirm or verify the authenticity of the program executed by an associated processor.

Using a security element to verify the authenticity of a processor's program presents at least two challenges. First, the communication between a processor and a security element should not allow someone to read program instructions that might be exchanged between a processor and its associated security element during a verification process. Second, the processors used in a vehicle must start quickly. Since an authenticity check is often performed when a processor starts running, a program authenticity check must be performed quickly. In view of those two challenges, an apparatus and method to quickly authenticate the software or program executed by a vehicle processor, and either inhibit the processor executing an unauthorized program or notify a vehicle operator, would be an improvement over the prior art.

DETAILED DESCRIPTION

Figure 1:
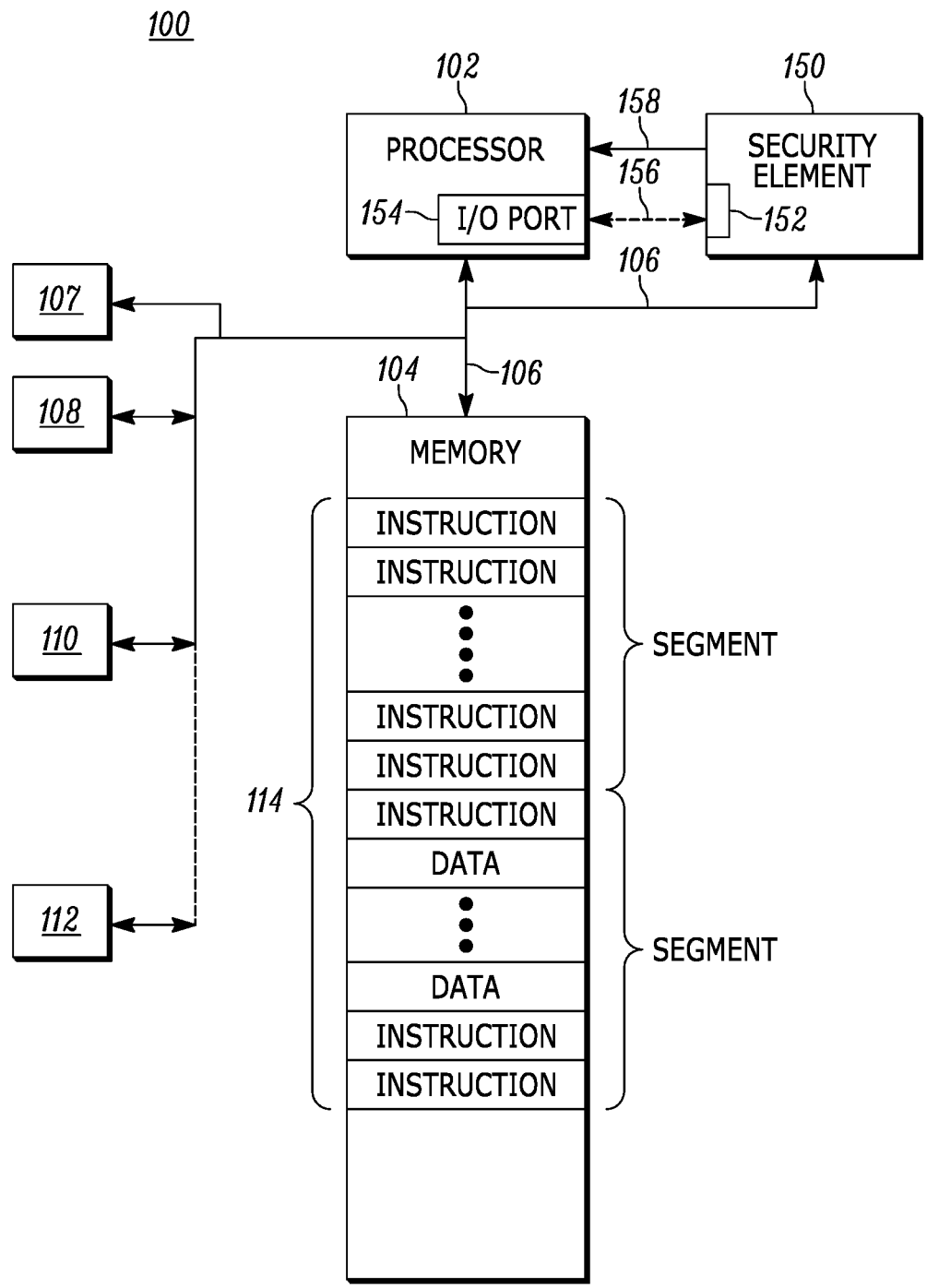
FIG. 1 is a block diagram of an apparatus for authenticating a computer program for a vehicle-located processor.

FIG. 1 depicts an apparatus 100 to quickly authenticate a computer program for a vehicle-located processor, i.e., a processor, put into a vehicle by a vehicle's manufacturer at the time of its assembly. The apparatus 100 comprises, of course, a vehicle-located processor 102. The processor 102 is electrically connected to a non-transitory memory device 104 through a conventional bus 106. The memory device and the bus 106 can be on the same silicon die as the processor 102. In other embodiments, the memory device is physically separated from the processor 102, i.e., on a different silicon die, and accessed by the processor 102 using a conventional bus 106 extending between the processor 102 and the memory device 104.

In FIG. 1, vehicle systems 108, 110 and 112 are coupled to the bus 106 and thus communicate with the processor 102 using the bus 106. The operation of those peripheral devices 108, 110 and 112 is determined or controlled by program instructions 114 stored in the non-transitory memory element 104, regardless of where the memory element 104 is located and connected to the processor 102. Changing any of the instructions can therefore change the operation of the processor 102 and devices peripheral to it 108, 110 and 112.

The apparatus 100 includes a "security element" 150 "coupled" to the processor 102 and pre-programmed to verify the authenticity of the instructions 114 in the memory device 104 when the apparatus 100 is manufactured. In one embodiment, the security element 150 is considered to be "external" to the processor 102 because the security element 150 is a separate processor programmed at the time of the vehicle's manufacture. In other embodiments, the security element 150 is on the same physical die as the processor 102 but logically separated from the processor 102.

For security purposes, preferred embodiments of the security element 150 are not reprogrammable. For flexibility purposes, alternate embodiments of the security element 150 are reprogrammable.

The security element 150 can be operatively coupled to the processor 102 at least three (3) different ways. In a first embodiment, the security element 150 is connected to a bus 106 that extends between the processor 102 and peripheral devices 108, 110, 112 controlled by the processor 102. In a second embodiment, wherein the processor 102 and security element 150 are on the same silicon die and that die has on-board non-transitory memory, a processor for the security element 150 shares an "internal" bus, i.e., a bus on the same silicon die. In a third embodiment, an input/output (I/O) port 152 is coupled to a corresponding I/O port 154 on the processor 102. An I/O port-to-I/O port communications link 156 allows information to be exchanged between the processor and the security element 150 without accessing the bus 106.

A control line 158 extends from the security element to the processor 102 and carries a signal from the security element 150 to the processor 102. When the signal from the security element 150 is received by the processor 102, the signal causes the processor 102 to either halt its operation or to raise an alarm notifying the vehicle operator that the program instructions 114 and the memory device 104 are not authentic, i.e. have been changed without the manufacturer's authorization. Examples of an alarm include illuminating a warning light or warning sound or disabling a corresponding feature or operation of the vehicle.

Those of ordinary skill in the art should recognize that faster authentication of the program and the memory device 104 can be achieved by reducing the number of operations that must be performed by the security element 150 to determine the program's authenticity.

As used herein, the term, "hash function" refers to any mathematical function that can be used to map data of an arbitrary size to data of a fixed size. Numeric values returned by a hash function are called hash values, hash codes, digests, or simply hashes. The Security Hash Algorithm 2 or "SHA-2" algorithm is one example of a hash function that will produce a corresponding hash code.

Figure 2:
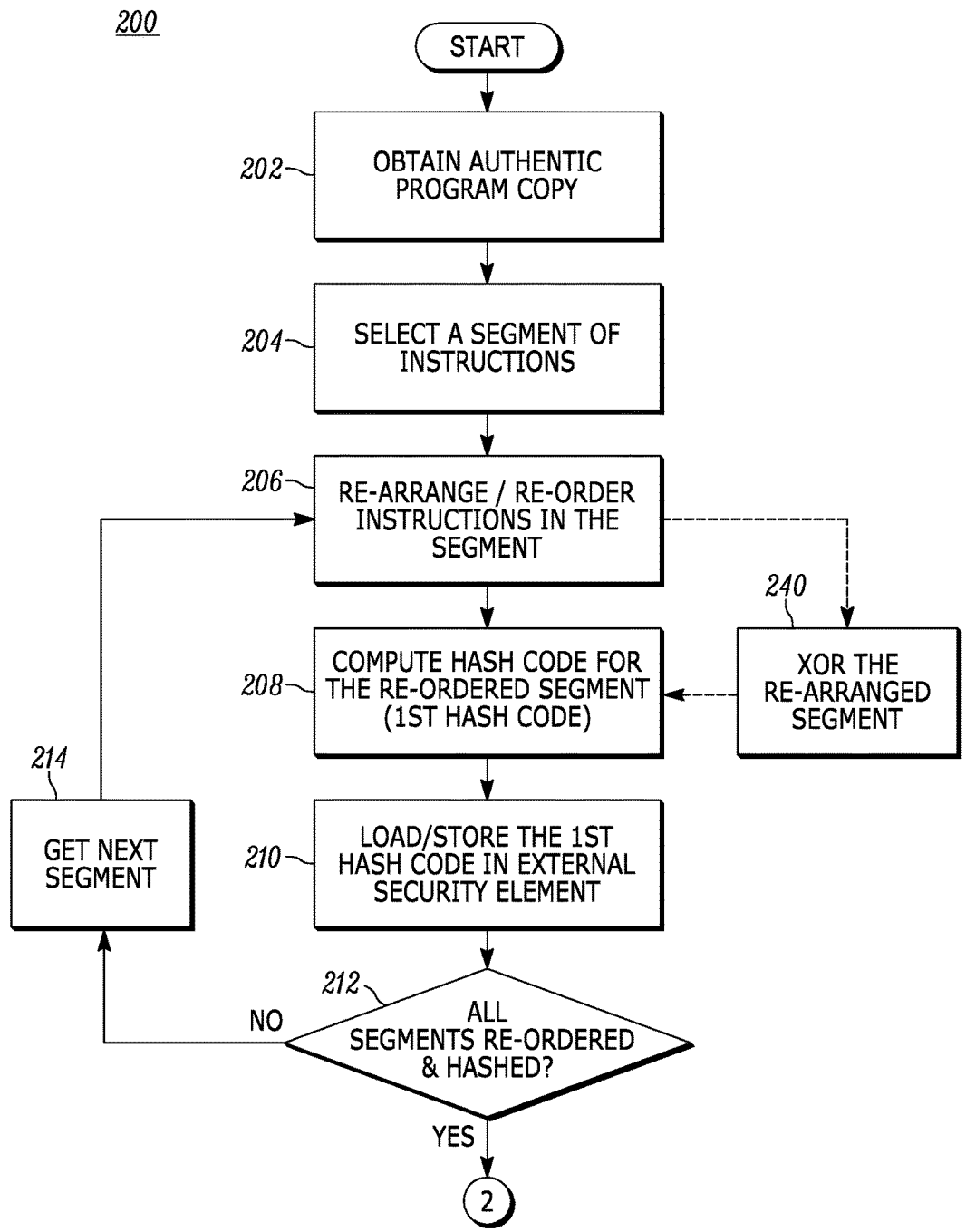
FIG. 2, FIG. 3 and FIG. 4 depict steps of a method to authenticate a computer program for a vehicle-located processor using a security element coupled to the vehicle-located processor.
Figure 3:
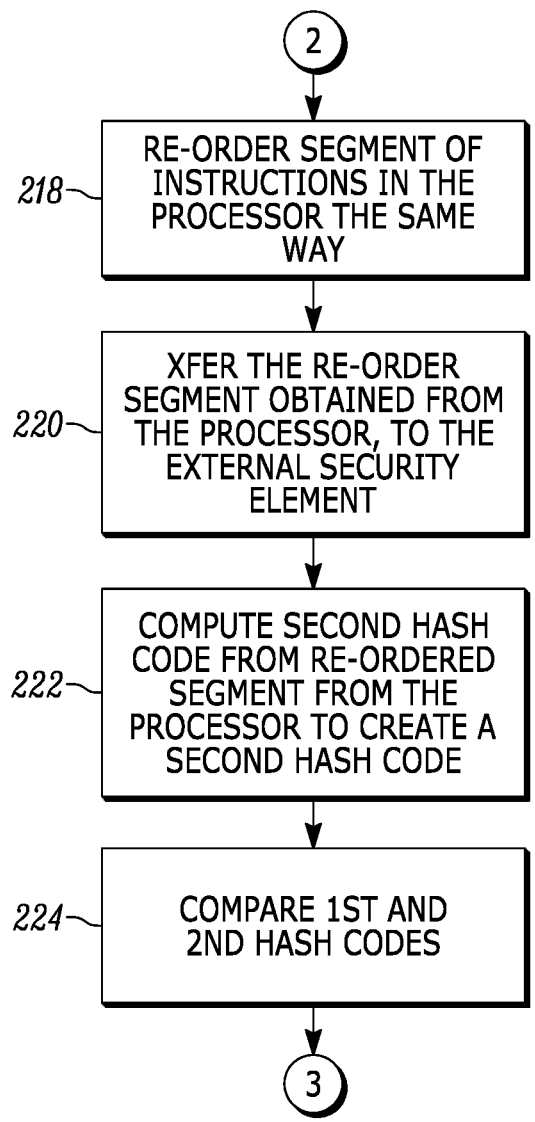
Figure 4:
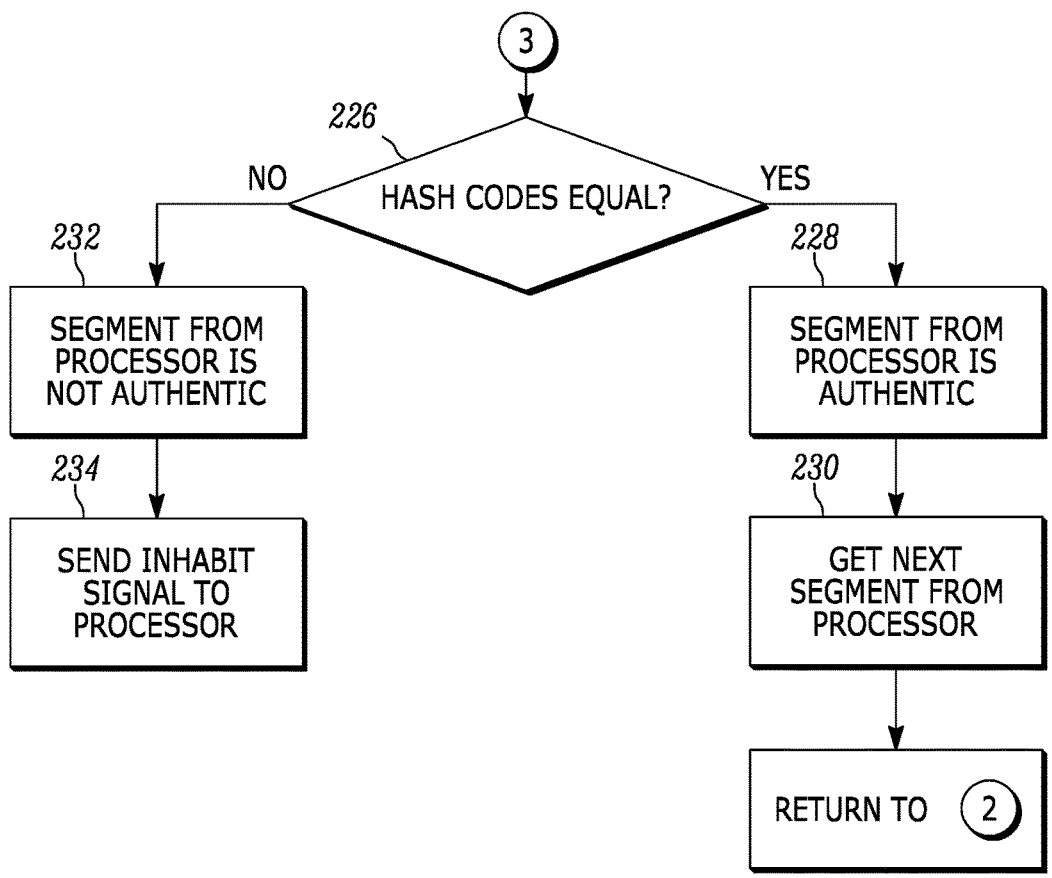

FIG. 2, FIG. 3 and FIG. 4 depict steps of a method 200 for authenticating a computer program for a vehicle-located processor using a security element coupled to a processor, FIG. 3 and FIG. 4 simply showing steps of the method 200 that do not fit on FIG. 2. An "authentic" program is one provided to the processor by the vehicle's manufacturer. Stated another way, post-manufacturer modifications to a program that are made by unauthorized third parties are not considered to be authentic.

At a first step 202 a security element, such as the security element 150 depicted in FIG. 1, is provided or obtains an "authentic" copy of the program that is supposed to be executed by the processor 102. At a second step 204, the security element selects a segment or subset of instructions from the authentic copy that was provided to the security element. An "instruction segment" is the content of a pre-determined, fixed number of consecutive memory locations e.g., 256, preferably starting from the "beginning" of the program or an address within a memory device.

By way of example, the contents of memory locations 0-255 can be the first segment of instructions, regardless of whether those locations contain executable instructions or data. The contents of locations 255-512 can also be a "first" instruction segment. Memory locations 0-7, 8-16, 0-128 can also be instruction segments.

In a preferred embodiment, at step 206, an instruction segment of the authentic copy of the program is "re-ordered" by the processor in the security element using a pseudo-random re-ordering sequence, which is provided to the security element processor as a "transfer order table." Stated another way, at step 206, the order of the instructions that make up a segment from the authentic copy are essentially "pseudo-scrambled" according to a known and pre-determined scrambling or re-ordering sequence.

Re-ordering instructions in a program segment helps prevent pirating the program, i.e., it helps prevent copying of a program's object (machine) code and a subsequent de-compilation to yield a copy of the program that can be modified, or used to find program vulnerabilities.

At step 208, a hash code for the authentic, re-ordered segment (provided at step 206) is calculated by the security element processor, and provides what is referred to herein as a "first" hash code for the re-ordered, authentic segment. Any change to the instructions in a program or a program segment will produce a hash that is different from the hash code produced by an authentic copy of the same program or the same program segment. Any different re-ordering of a program's instructions or the instructions in a program segment will also produce a different hash code. The first hash code thus provides a unique representation of an "authentic" segment of a program.

At step 210 the "first" hash code of an authentic program segment and which was obtained by hashing the re-ordered segment of an authentic copy, is stored in the security element 150 for use in determining the authenticity of a program copy used by the processor to which the security element 150 is coupled.

In FIG. 2, a test is conducted at step 212 to determine whether all segments of the authentic copy of the program have been re-ordered and hashed by the security element. At step 214, the method thus returns to step 206 for a second or next segment of the authentic copy, which is re-ordered at step 206, hashed at step 208 and the hash of the next segment stored into the security element at step 210. When all of the segments of the authentic program copy have been hashed, the program proceeds to step 218.

Referring now to FIG. 3, at step 218, performed by the processor 102 that executes a program that needs authenticity verification, a first segment of the processor's instructions are re-ordered by the processor in the same way that the first segment of known authentic instructions was re-ordered by the security element at step 206. At step 220, the re-ordered segment of instructions from the processor 102 is transferred to the securing element 150 over a bus connecting the processor to the security element.

(In an alternate embodiment of step 218, segments of the processor's instructions are not re-ordered by the processor but are instead sent to the security element where the program segments are re-ordered by the security element in the same way that the known-to-be authentic instructions are re-ordered by the security element at step 206.)

Once the re-ordered segment is obtained by the security element, the security element hashes the re-ordered segments it received from the processor 102. A "second" hash code is thus computed by a processor in the security element at step 222 and at step 224, the second hash code is compared to the "first" hash code computed by the security element for the same segment of the known, authentic copy of the program.

Referring now to FIG. 4, if the first and second hash codes for the known authentic copy and the processor copy are determined at step 226 to be equal, the method 200 assumes that the two corresponding segments of instructions (re-ordered and hashed using the same steps) are identical.

At step 228, the segment obtained from the processor is considered to be authentic. The method thus proceeds to get the next segment from the processor at step 230. That "next" segment is re-ordered and hashed. The program/method returns to step 202 where the re-ordering of the next segment is performed followed by its hashing.

Referring again to step 226, if the two hash codes are not equal, the segment obtained from the processor 102 is not authentic. At step 234, an inhibit signal is sent to the processor by the security element 150.

When the processor 102 sees the inhibit signal, it can take various different actions responsive thereto. In one embodiment, the inhibit signal provided at step 234 causes the processor 102 to halt execution of the counterfeit program. In a second embodiment, the processor 102 generates and outputs a signal on the bus 106 which causes an indicator light 107 on the vehicle's dashboard to illuminate, thereby notifying the driver or vehicle owner that a problem with vehicle firmware authenticity has been detected.

Referring back to FIG. 2, in an alternate embodiment of the method 200, step 206 is followed by an exclusive-ORing step 240. The exclusive ORing step 240 adds an operation or step whereat every re-ordered instruction of a segment is exclusive-ORed (Boolean) by a binary value made up of the same number of binary digits as the re-ordered instructions. In a preferred alternate embodiment, the exclusive-OR values applied at step 240 are themselves pseudo-randomized such that every re-ordered instruction in a segment is exclusive-OR'ed by a non-sequential value.

Figure 5:
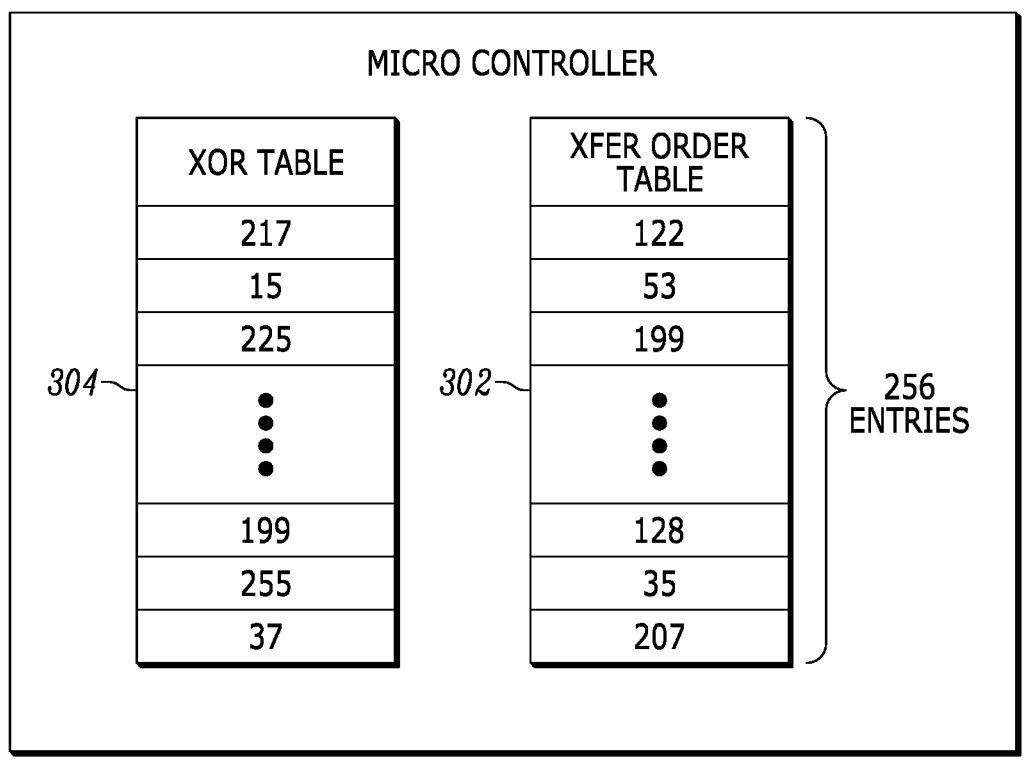
FIG. 5 depicts a transfer order table and an exclusive OR-table, which are used in the method described and shown in FIG. 2, FIG. 3 and FIG. 4.

FIG. 5 depicts both a transfer order table 302 and an exclusive OR table 304. In a preferred embodiment, the transfer order table 302, and which is shown in FIG. 3, has a length of 256 entries. Alternate embodiments use transfer order tables of lengths other than 256 entries.

The transfer order table 302 specifies the order in which 256 consecutive instructions or memory locations of a segment of program are to be re-arranged or "re-ordered" prior to hashing. The exclusive-OR table 304 comprises values, here 256 values, each of which is exclusive-ORed against an instruction and a segment specified by a corresponding entry of the exclusive OR table.

By way of example, using the transfer order table 302 shown in FIG. 3, 256 consecutive instructions or (the contents of consecutive memory locations) of a segment of program are re-ordered with the $122^{nd}$ instruction, followed by the $53^{rd}$ instruction, followed by the $199^{th}$ instruction. The last three instructions of the 256 instruction segment are the $123^{rd}$, $35^{th}$ and $207^{th}$ instruction. At step 240, the $122^{nd}$ instruction from the segment is exclusive-ORed by the value "217." The $53^{rd}$ instruction of 256 instructions comprising a segment is exclusive-ORed by the value "15." The $199^{th}$ instruction of 256 instructions of a segment is exclusive-ORed by the value 225.

Those of ordinary skill in the art should recognize that the security element 150 shown in FIG. 1 necessarily includes a processor, not shown in FIG. 1, but well known to those of ordinary skill in the art.

In a preferred embodiment, the processor 102 requests the security element to authenticate its operating instructions in the memory device 104 by sending an authentication request. In an alternate embodiment, the security element can request an authentication and take action if the processor doesn't respond thereto. A security element-initiated authentication will typically take place after some predetermined event has occurred or after a predetermined amount of time has elapsed. In such an alternate embodiment, if a processor's program or firmware has been corrupted and the processor doesn't issue an authentication request the secure element will nevertheless detect the problem and take appropriate action.

The foregoing description is for purposes of illustration only. The true scope of the invention is set forth in the following claims.

What is claimed is:

1. A method to authenticate a computer program coupled to a non-transitory computer readable medium for a vehicle-located processor, using a security element operatively coupled to the vehicle-located processor, wherein the security element is a processing circuit, the vehicle-located processor being configured to execute the program, the program comprising executable instructions arranged in a sequence, the method comprising:

re-ordering a pre-determined number of instructions obtained from a first pre-determined segment of a first copy of said program, the first copy being known to be authentic, the re-ordering being according to a second sequence, which is different than the first sequence;

computing a first hash code of said re-ordered pre-determined number of instructions obtained from the first copy, the first hash code being computed using a first hash function;

storing the first computed hash code in the security element;

in the vehicle-located processor:

re-ordering the same pre-determined number of instructions obtained from the same pre-determined segment of a second copy of said program, the second copy of the program being obtained from the vehicle-located processor, which is also coupled to the security element, the authenticity of the second copy being unknown, the re-ordering of the instructions from the second copy being according to the same second sequence;

providing the re-ordered first number of instructions obtained from the pre-determined segment of the second copy to the security element;

in the security element:

computing a second hash code of said first number of instructions that are obtained from the pre-determined segment of the second copy, the second hash code being computed by the security element using the first hash function;

determining whether the first and second hash codes are identical;

whereby, when the first and second hash codes are determined by the security element to not be identical, providing an inhibit signal to the processor from the security element, the inhibit signal causing the processor to alter execution of the program, wherein the processor halts the execution of the program.

2. The method of claim 1, wherein the step of altering program execution includes preventing the processor from executing the second copy of the program.

3. The method of claim 1, wherein the step of altering program executing includes generating an alarm signal by the processor.

4. The method of claim 1, wherein the processor is configured to request the security element to authenticate the second copy of the program.

5. The method of claim 1, wherein the security element is configured to request an authentication of the second copy of the program if the processor does not request authentication.

6. The method of claim 1, wherein the steps of re-ordering a pre-determined number of instructions, obtained from a first pre-determined segment of a first copy of said program and computing a first hash code are performed by a processor not part of the security element.

7. The method of claim 1, wherein the steps of re-ordering a pre-determined number of instructions, obtained from a first pre-determined segment of a first copy of said program and computing a first hash code are performed by a motor vehicle manufacturer and where the step of storing the first computed hash code is performed prior to shipment of a vehicle from the manufacturer.

8. The method of claim 7, wherein the exclusive-ORing steps are performed using a table of values, the table having a length equal to the predetermined number, each value being a number between zero and the pre-determined number.

9. The method of claim 8, wherein the request to authenticate the second copy of the program is generated by the processor using a secret key.

10. The method of claim 1, wherein the steps of re-ordering the same pre-determined number of instructions obtained from the same pre-determined segment of a second copy of said program and providing the re-ordered first number of instructions obtained from the pre-determined segment of the second copy to the security element, are performed by a processor in a motor vehicle.

11. The method of claim 1, wherein the second sequence comprises a sequence of numbers, the value of each number identifying a relative location of an instruction in the pre-determined segment of the first and second copies of the program.

12. The method of claim 1, further comprising the step of:
after the step of re-ordering a pre-determined number of instructions, obtained from a first pre-determined segment of a first copy of said program and prior to the step of computing a first hash code, exclusive-ORing each instruction of the re-ordered, pre-determined number of instructions obtained from the first pre-determined segment of the first copy of said program known to be authentic;
and
after the step of re-ordering the same pre-determined number of instructions obtained from the same pre-determined segment of a second copy of said program, exclusive-OR-ing each instruction of the re-ordered, pre-determined number of instructions obtained from the first pre-determined segment of the second copy of said program known to be authentic.

13. The method of claim 1, wherein the first hash function is a Secure Hash Algorithm 2 (SHA-2) algorithm.

14. The method of claim 13, wherein the security element determines validity of the request to authenticate the second copy using a public key.

15. The method of claim 1, wherein second sequence is stored in a transfer order table, which is accessible to the vehicle-locate processor but which is not accessible to the security element.

16. The method of claim 1, further comprising:
at the processor:
incrementing a counter value;
sending to the security element, a request to authenticate the second copy of the program and the counter value;
at the security element:
storing the counter value received from the processor;
determining the validity of the request to authenticate the second copy of the program using the counter value received from the processor; and
not comparing the first hash code to the second hash code if the counter value received from the processor is not greater than a previously-received and stored counter value or if the validity of the request to authenticate the second copy of the program is not valid.

* * * * *